United States Patent [19]

Holda et al.

[11] Patent Number: 4,961,148

[45] Date of Patent: Oct. 2, 1990

[54] METHOD FOR PREPARING AUTOMOTIVE ASSEMBLY OPERATIONS DOCUMENTS

[75] Inventors: Steven F. Holda, Milford; Francis E. Plonka, Grosse Pointe; Daniel J. VandenBrossche, New Baltimore; John S. Felice, Rochester, all of Mich.

[73] Assignee: Chrysler Corporation, Highland Park, Mich.

[21] Appl. No.: 306,720

[22] Filed: Feb. 6, 1989

[51] Int. Cl.⁵ ............................................. G06F 15/46
[52] U.S. Cl. .................................... 364/468; 364/191; 364/512
[58] Field of Search ................... 364/468, 478, 474.24, 364/191–193, 188, 189, 400, 401, 403, 512

[56] References Cited

U.S. PATENT DOCUMENTS

| | | | |
|---|---|---|---|
| 4,472,783 | 9/1984 | Johnstone et al. | 364/468 |
| 4,709,337 | 11/1987 | Knapp et al. | 364/468 |
| 4,827,423 | 5/1989 | Beasley et al. | 364/468 |
| 4,845,634 | 7/1989 | Vitek et al. | 364/468 |
| 4,862,376 | 8/1989 | Feriter et al. | 364/468 |

Primary Examiner—Joseph Ruggiero
Attorney, Agent, or Firm—Edward A. Craig

[57] ABSTRACT

A method for preparing documents that enable execution of automotive assembly operations at a central production engineering location and electronically transmitting the documents to a remote user location is provided. The method involves the use of data terminals at both locations with a computer interposed therebetween to permit transmission of data and to provide a formatting technique which is easily understandable and usable.

2 Claims, 2 Drawing Sheets

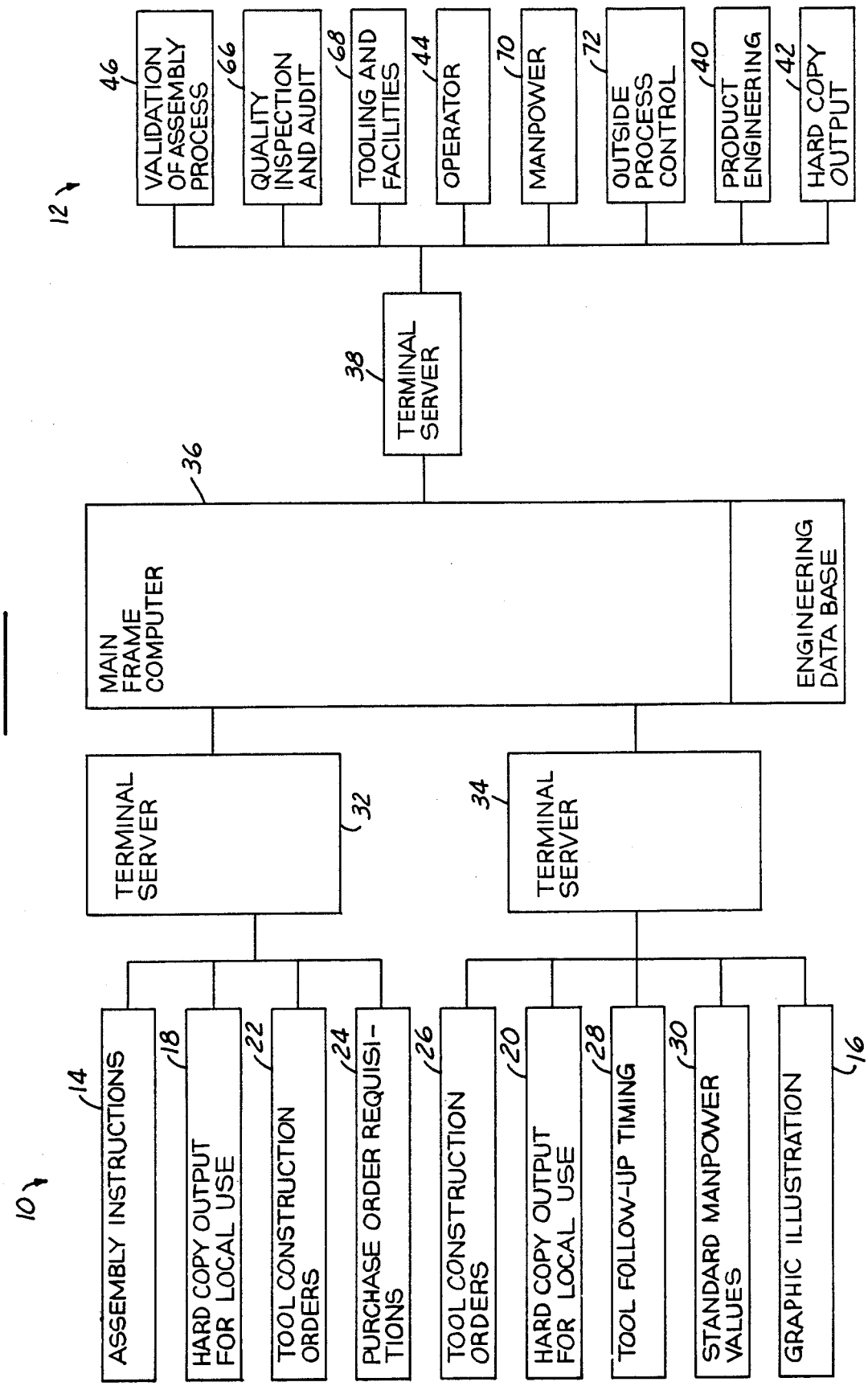

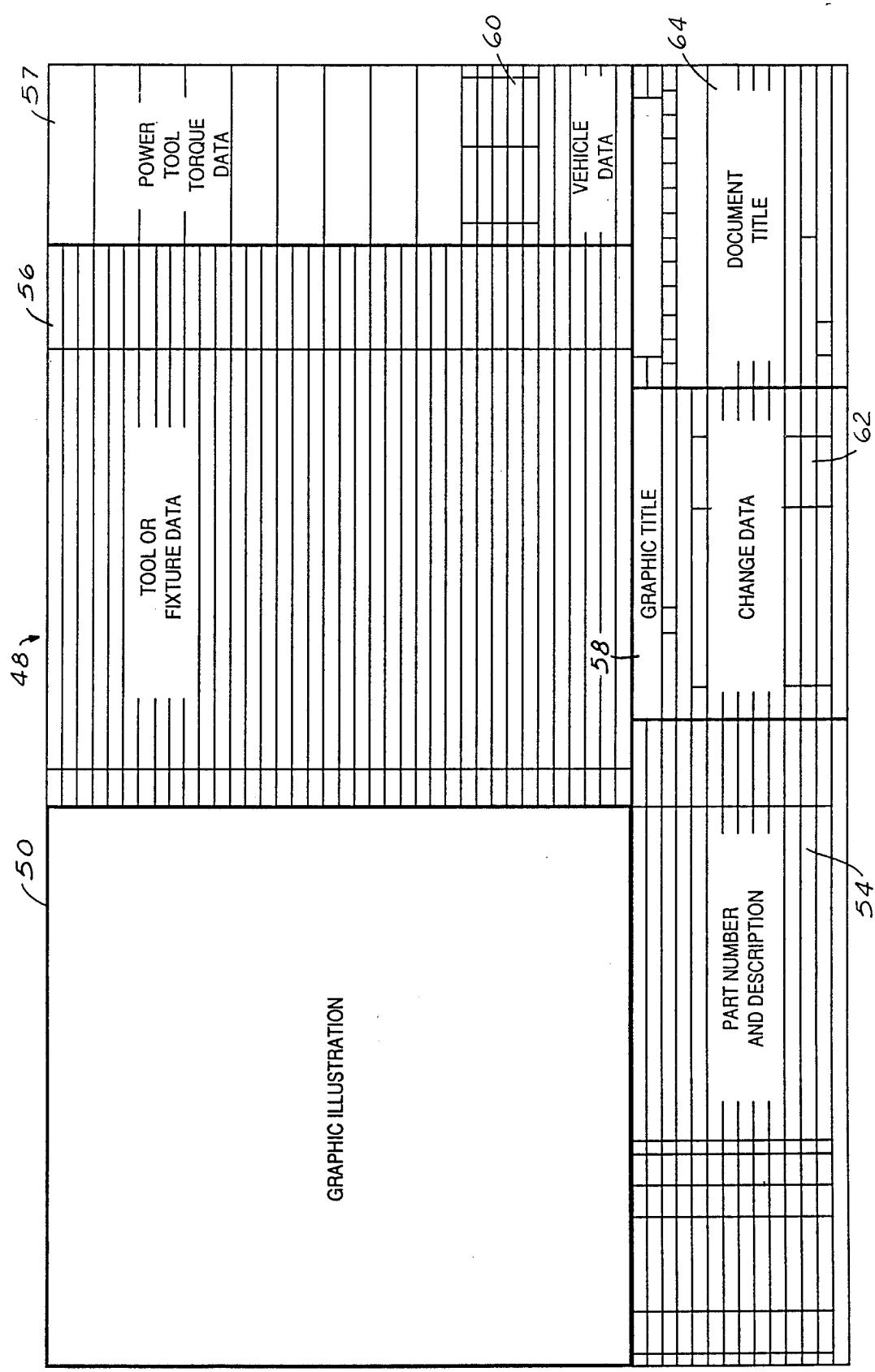

METHOD FOR PREPARING AUTOMOTIVE ASSEMBLY OPERATIONS DOCUMENTS

BACKGROUND OF THE INVENTION

1. Field of the Invention:

This invention relates to a method for preparing documents that enable execution of discrete automotive assembly operations at a central production engineering location and electronically transmitting the documents to a remote user location.

2. Prior Art:

Manufacturers of mass-produced vehicles, both cars and light trucks, constantly strive to reduce the cost of manufacture while at the same time increase the quality of the product. The increased complexity of vehicles has made this job more difficult than it was in the past. The accepted practice for mass-producing vehicles is to use a continuously moving assembly line attended by operators, each of whom is assigned a specific task or tasks to complete on each vehicle.

The proper method for performing these tasks is originally developed by a centralized group of technical personnel, usually referred to as "production engineering". This group is an assembly of people who have expertise in vehicle assembly processes. Members of this group analyze each task which is to be preformed in the assembly of a vehicle and determine the best mode for performing the task, including selection of the tools needed to perform the task and identification of the parts to be acted upon.

After an initial period of analysis, the information necessary for completion of a given task is reduced to document form, the document commonly being referred to as an operation description sheet. This document describes the process for assembling components of a vehicle on an assembly line. In addition to a written description, graphic illustrations are frequently utilized to show the parts being acted upon and the inter-relationship of these parts, including indicia indicating the assembly sequence. The document includes additional information in relation to the tools required, and formal notations relating to such matters as part number, title and the like.

In the past, these documents have been prepared manually and sent to vehicle assembly plants for use. The system has proved to be somewhat inefficient, it being appreciated that physical transmittal of documents takes time. The time element is of particular importance with reference to needed changes in the documents, which needed changes may be recognized at the assembly plant. The transmission of the paper documents back and forth between the production engineering group and the assembly group results in an undesirable time lag. Additionally, the masses of paper required results in expensive handling costs.

In accordance with the present invention, a method utilizing an electronic system in computerized form is provided for preparing the documents to enable execution of automotive assembly operations. This is done at a central production engineering locations with the documents being electronically transmitted to a remote user location, usually an assembly plant, but also possibly for a pilot program or like developmental function. It will be appreciated that a major automotive company normally has assembly plants in several locations scattered throughout the country. The present method overcomes the geographical problems which have been encountered in the past.

SUMMARY OF THE INVENTION

A method for preparing documents that enable execution of discrete automotive assembly operations at a central production engineering location and electronically transmitting the documents to a remote user location is provided.

The method includes providing first data terminal means at the central production engineering location for entry of assembly instruction data, graphic illustrations and related data All of this data is entered into the first data terminal means to create documents that enable execution of discrete automotive assembly operations This input data is communicated from the first data terminal means to a central computer. The input data is processed at the central computer into a format which can be printed or displayed on a electronic display device monitor, the format including the information needed to enable execution of a discrete automotive assembly operation.

The thus formatted data is communicated to a remote user location. Second data terminal means is provided at the remote user location. The formatted data is received by means of the second data terminal means and is reviewed for operability and verification of vehicle design intent. After this review, any needed change data is entered into the second terminal means and communicated from the second data terminal means to the central computer. The change data is processed at the central computer for transmission to the first data terminal means for consideration at the central production engineering location. This change data is received and reviewed by means of the first data terminal means and any needed changes are made and retransmitted to the remote user location.

Finally, the documents are used at the remote location in either printed form or on electronic display device monitors to enable execution of discrete automotive operations.

Document data is provided relating to graphic illustrations, part number and description, description of assembly operation, assembly power tool torque, graphic illustration identification, vehicle identification, changes, and title, as needed.

BRIEF DESCRIPTION OF THE DRAWINGS

FIG. 1 is a schematic view of the electronic components and related functions used in accordance with the method of the present invention; and FIG. 2 is an illustration of the format of a typical document prepared in accordance with the present invention.

DETAILED DESCRIPTION OF A PREFERRED EMBODIMENT

Referring to FIG. 1, it will be noted that there is a central production engineering location 10 and a remote user location 12. The remote user location 12 is normally a vehicle assembly plant.

Documents that enable execution of discrete automotive assembly operations are prepared at the central production engineering location 10 and electronically transmitted to the remote user location 12.

First data terminal means are provided at the central production engineering location 10 for entry of assembly instruction data, graphic illustrations, and related data. The assembly instructions or descriptions with which the present method is primarily concerned are entered at station 14. This station is not a single location but includes numerous data terminals which are used for entering assembly instruction data. The data terminals used at station 14 and at other stations where data terminals are used may be, for example, model VT240, offered by Digital Equipment Corporation. The information entered at station 14 includes such items as part number and description, description of assembly operation, assembly power tool torque and vehicle identification.

Station 16 is also utilized in preparing the desired document. The function of station 16 is to enter graphic illustrations used in some, but not all, of the documents. Station 16 employs a scanner which may, for example, be the 3001 series offered by Optigraphics Incorporated. The graphic illustrations used are preferably first prepared by a CAD system which permits permanent storage and which facilitates making changes as necessary.

The remaining stations at the central production engineering location 10 are useful in the manufacturing process, but do not form part of the present method. Stations 18, 20 comprise printers for printout of documents for local use. The printers may be, for example, laser printer model number LNO3 offered by Digital Equipment Corporation. Station 22 includes data terminal equipment for entering tool construction orders, station 24 includes data terminal equipment for entering purchase order requisitions, station 26 includes data terminal equipment for entering tool construction orders, station 28 includes data terminal equipment for tool follow-up timing entries, and station 30 includes data terminal equipment for entering standard manpower values.

Part of the equipment at the central production engineering location 10 is connected to one terminal server 32 while the remainder of the equipment is connected to a second terminal server 34. The terminal servers may be, for example, model DEC Server 200, offered by Digital Equipment Corporation. The terminal servers 32, 34 are connected to a mainframe computer 36. The computer 36 may be, for example, model VAX 11-780 offered by Digital Equipment Corporation. The computer 36 may be programmed by use of commercially available software to accomplish the desired computer processing of the input data. In one operational embodiment, data base software, offered under the name "Ingres" by Relational Technology, Inc., is utilized to manage all the data that the system uses. The remaining software used is offered by Digital Equipment Corporation under various names. "CMS" is used as a code management system. This software manages all source code and executable images for the system. "CADOC" is a graphics software that allows modifications to two-dimensional illustrations, viewing graphics on the electronic display device monitors of the data terminals, and printing on the laser printers. "FMS" is used as a forms management system. This software handles all of the screens that are viewed at the data terminals. "FORTRAN" is used as the computer language for the application source code.

After the input data from the first data terminal means provided at the central production engineering location 10 is entered, it is processed by means of the computer 36 into a format which can be printed or displayed on electronic display monitor screens and which includes the information needed to enable execution of a discrete automotive assembly operation. The formatted data is communicated to the terminal server 38 of the remote user location 12 and then to second data terminal means provided at the remote user location 12. The formatted data is reviewed for verification of vehicle design intent at station 40 which includes data terminal equipment. This information is reviewed by product engineering personnel who are familiar with the specific vehicle to which the formatted data applies. Personnel at the remote user location frequently have information peculiar to the on-site location which may not be available to, or which may have not been considered by the personnel in the product engineering group at the central product engineering location 10. Any needed change data is entered at station 40 and communicated to the central computer 36. This data is processed by means of the central computer for transmission to the first data terminal means provided at the central product engineering location 10. The submitted change data is received and reviewed at the central production engineering location. Any needed changes in accordance with the submitted change data is made in the manner previously described with respect to original input data from the location 10. Any re formatted data is then retransmitted as previously described to the remote user location 12. Another station 46 having data terminal equipment is used at the pilot stage (and later during actual production) of building a vehicle, The pilot stage is an initial pre-production stage prior to the actual production of the vehicle for sale to the public. The formatted data is received at station 46 and vehicle units are actually built for pilot purposes to validate the assembly process. Any problems associated with the actual building of a pilot vehicle are noted and transmitted to the central production engineering location 10 for consideration as above-described.

A typical format for the final document which enables execution of automotive assembly operations is illustrated in FIG. 2. As will therein be noted, the document 48 is formatted into defined areas, each of which relates to a different set of data. Graphic illustrations are provided in area 50, part number and description of parts is provided in area 54, data relative to the needed tools or fixtures is provided in area 56, data relative to the torque specification for assembly power tools is provided in area 57, identification of the graphic illustration used is provided in area 58, identification of the vehicle to which the document pertains is provided in area 60, any data relative to changes which have been made is provided in area 62, and the title of the document is provided in area 64. As will appreciated, this data provided in the various indicated area is only provided as needed for the particular document and, in some cases, various portions of the data may be deleted.

The final document is utilized for several purposes. The primary function of the system is to serve the operator who does the physical assembly of the vehicle. The documents are available to the operators either by means of a electronic display device monitor available at data terminal station 44 or a hard copy printer available at laser printer station 42. Station 66 has data terminal equipment which is used by assembly plant personnel for quality inspection and audit, station 68 has data terminal equipment which is used by assembly plant personnel for ordering power tools, hand tools, work benches and the like in accordance with the instructions set forth in the document, station 70 has data terminal equipment which is used for manpower allocation in accordance with the assembly operations set forth in the document, and, finally, station 72 has data terminal equipment which is utilized to monitor assembly operations to assure that they are performed in accordance with the instructions provided in the documents.

We claim:

1. A method for preparing documents that enable execution of discrete automotive assembly operations at a central production engineering location and electronically transmitting the documents to a remote user location comprising the steps of:

a. providing first data terminal means at the central production engineering location for entry of assembly instruction data, graphic illustrations data, and related data;

b. entering such data into the first data terminal means to create documents that enable execution of discrete automotive assembly operations;

c. communicating the input data from the first data terminal means to a central computer;

d. processing the input data at the central computer into a format which can be printed or displayed on electronic display device monitors and which includes the information needed to enable execution of discrete automotive assembly operation;

e. communicating the thus formatted data to a remote user location;

f. providing second data terminal means at the remote user location;

g. receiving the formatted data by means of the second data terminal means and reviewing it for operability and verification of vehicle design intent;

h. entering any needed change data into the second terminal means;

i. communicating the change data from the second data terminal means to the central computer;

j. processing the change data at the central computer for transmission to the first data terminal means for consideration at the central production engineering location;

k. receiving and reviewing the change data by means of the first data terminal means and making any needed changes in accordance with steps b, c, d and e; and l. using the documents at the remote location to enable execution of discrete automotive operations.

2. The method as set forth in claim 1, further characterized in providing document data including data relating to graphic illustrations, part number and description, description of assembly operation, identification of tools or fixture needed, assembly power tool torque, graphic illustration identification, vehicle identification, changes, and title, as needed.

* * * * *